March 21, 1950   M. WALLACE   2,501,109
RADAR DISTANCE AND ALTITUDE INDICATOR
Filed Nov. 22, 1946   2 Sheets-Sheet 1
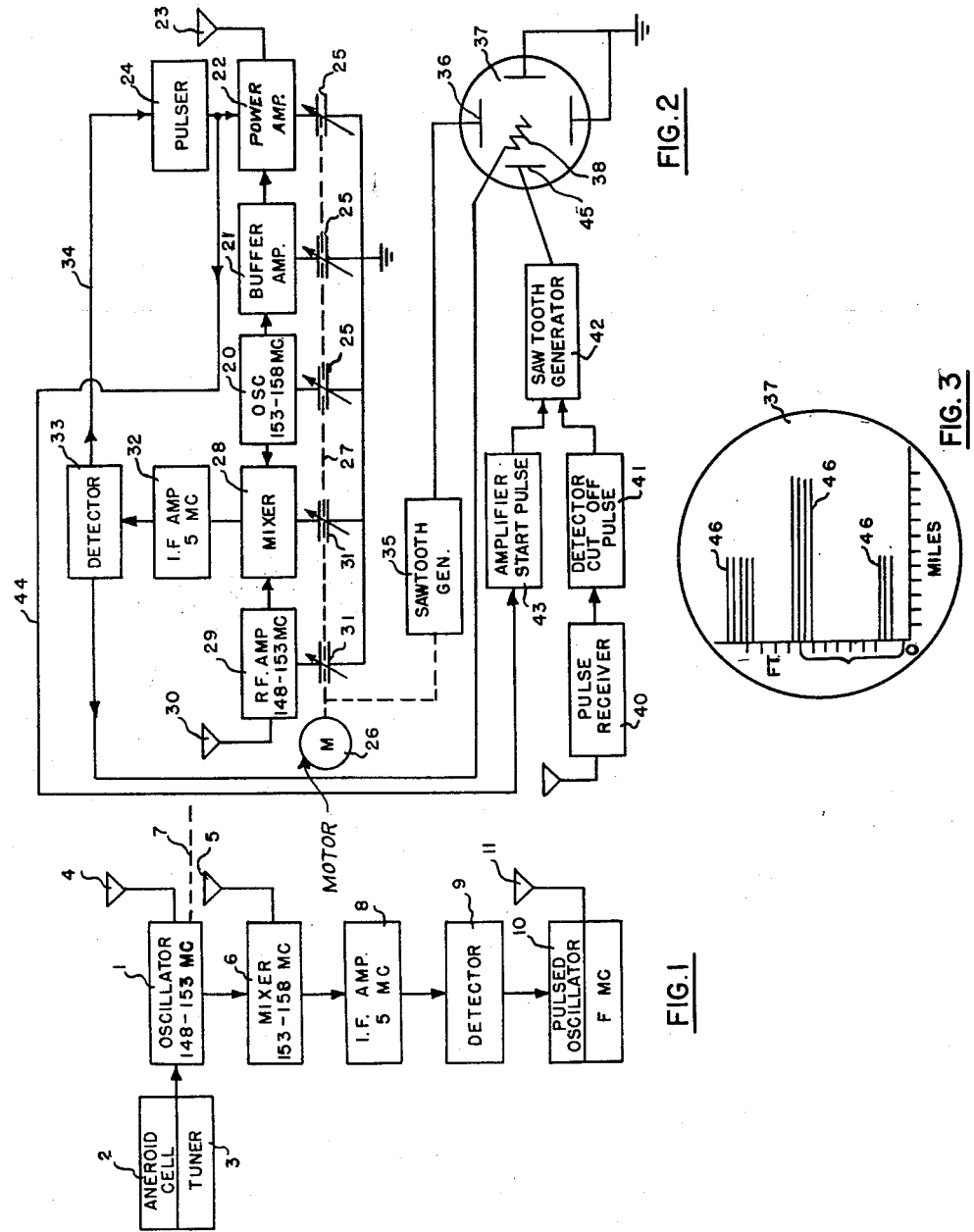
Inventor
MARCEL WALLACE
By Hyman Hurvitz
Attorney March 21, 1950 M. WALLACE 2,501,109
RADAR DISTANCE AND ALTITUDE INDICATOR
Filed Nov. 22, 1946 2 Sheets-Sheet 2
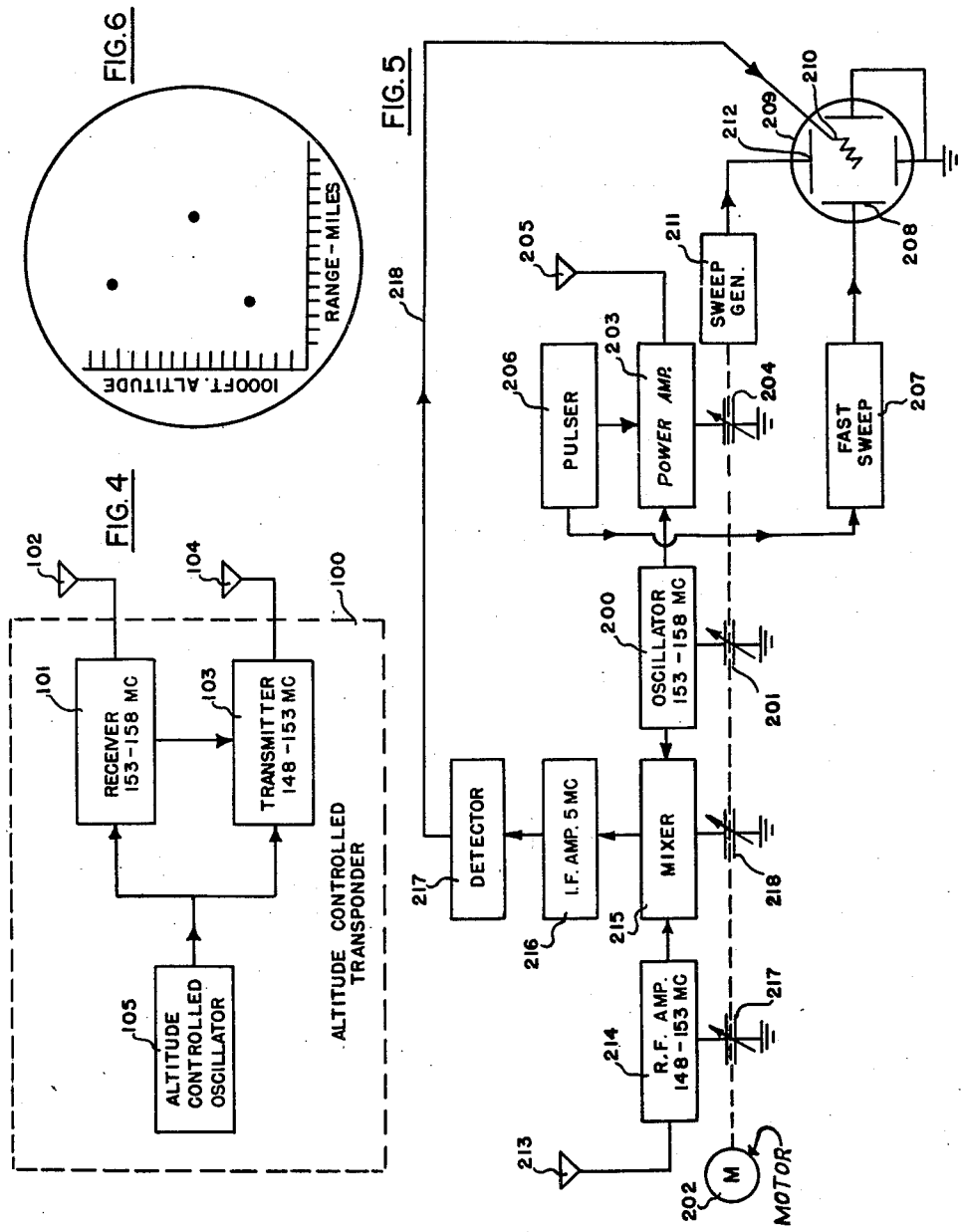
Inventor
MARCEL WALLACE
By Hyman Hurvitz
Attorney

UNITED STATES PATENT OFFICE 2,501,109

RADAR DISTANCE AND ALTITUDE INDICATOR

Marcel Wallace, Fairfield County, Conn., assignor, by mesne assignments, of one-half to Panoramic Radio Corporation, New York, N. Y., a corporation of New York Application November 22, 1946, Serial No. 711,503

23 Claims. (Cl. 343—6)

This invention relates generally to telemetric devices, and more particularly to devices for measuring simultaneously the range and the value of a measurable quantity associated with a remote device.

It is an object of the present invention to combine measurements of range made by means of pulse radar or sonar techniques with measurements of the value of a measurable quantity associated with the object ranged on.

It is a further object of the invention to make simultaneous measurements of range and of another quantity, range being measured in terms of time required for the traverse of pulse energy from a selected location to an object and for its return, and the other quantity being measured in terms of time of occurrence of the pulse in a periodic time scanning cycle.

It is still a further object of the invention to provide a system for displaying on the screen of a cathode ray tube indicator the simultaneous values of pairs of measurable parameters, one of which is range.

It is another object of the invention to provide a system for displaying on the face of a cathode ray indicator, as unitary indications, the ranges and altitudes of a plurality of aircraft.

It is a further object of the invention to provide a system for displaying simultaneously on the screen of a cathode ray indicator, the simultaneous values of a pair of navigational parameters associated with each of a plurality of aircraft.

It is still a further object of the invention to provide a system for displaying at a selected location, which may preferably be a ground station, the range and altitude of each of a plurality of aircraft.

It is a more particular object of the invention to provide a system for providing on the face of a cathode ray tube a plurality of visible indications, in the form of linear traces each having a length corresponding with range and a displacement corresponding with a measurable quantity associated with an aircraft or other vehicle.

It is an object of the invention in its broader aspect to provide a combined indication of the value of a measurable quantity as transmitted from a distant object, and of the range of that object.

It is a further object of the invention in its broader aspect to provide a novel pulse radar system wherein the pulses are transmitted in groups of one or more pulses each group occurring at a time which has telemetric significance.

It is still a further object of the invention to provide a radar system of the pulsed type wherein the time of transmission of each pulse or group of pulses is controlled in accordance with the value of a measurable quantity.

It is a further object of the invention to provide a radar system of the pulsed type wherein the time of transmission of each pulse or group of pulses is controlled telemetrically, and wherein the time elapsed between transmission and reception of each pulse as well as the time of transmission of each pulse or group of pulses are indicated concurrently and as a unitary indication.

The above and still further objects and advantages of the invention will become apparent upon consideration of the following detailed description of the invention, when taken in conjunction with the accompanying drawings, wherein:

Figure 1 is a functional block diagram of an airborne equipment, in accordance with one embodiment of the invention;

Figure 2 is a functional block diagram of a ground interrogator-responser radar, in accordance with one embodiment of the invention;

Figure 3 illustrates the appearance of indications of a cathode ray tube when provided with control signals in accordance with the invention;

Figure 4 is a functional block diagram of an airborne transponder, arranged in accordance with a further embodiment of the invention;

Figure 5 is a functional block diagram of a ground interrogator-responser, arranged in accordance with a further embodiment of the invention and which is adapted to co-operate with the transponder of Figure 3; and Figure 6 is a representation of the appearance of range-altitude presentation on the face of a cathode ray indicator, included in the interrogator-responser of Figure 5.

Proceeding now with a brief resume of the invention, as applied to one particular application thereof, there is provided aboard each of a plurality of aircraft flying in the vicinity of a ground station, a transmitter arranged to transmit continuously signals at a frequency corresponding with the value of a measurable quantity associated with aircraft, and which in the present application, and for purposes of exemplification only, is taken as the altitude of the aircraft.

Each aircraft carries, in association with its altitude transmitter, a receiver which is also tuned in accordance with the altitude of the craft, and which is constrained to maintain its tuning at a fixed frequency difference from the tuning of the transmitter. Associated with the receiver aboard each aircraft is a pulse transmitter, which is normally quiescent but which is energized in response to and for the duration of the reception of signals by the altitude tuned receiver and which when energized, transmits on a fixed frequency, which may be the same for all the craft utilizing the system.

At the ground station is provided a receiver and a transmitter which are maintained at a fixed difference of frequency, corresponding with the frequency difference of tuning allocated to the airborne altitude transmitter and receiver, and which are caused to scan synchronously over predetermined respective frequency spectrum portions, the ground transmitter scanning the total band of frequencies allocated to the airborne altitude receiver and the ground receiver scanning the total band of frequencies allocated to the airborne altitude transmitter.

The ground transmitter is normally maintained inoperative to transmit, but when operative transmits pulses which may be at any convenient length and rate. The ground transmitter is rendered operative to transmit in response to reception by the ground receiver of an altitude corresponding frequency deriving from an aircraft. Accordingly the ground transmitter transmits pulses or groups of pulses, each occurring at a frequency corresponding with the altitude of an aircraft. Since the transmitter frequency is being varied in accordance with a time function, the pulses or groups of pulses may also be considered to be transmitted at times corresponding with altitudes of aircraft.

Each airborne pulse transmitter is rendered operative to transmit at the same frequency but only at such times as the airborne altitude tuned receiver is receiving pulses from the ground transmitter. The pulses transmitted from the aircraft are received on a ground pulse receiver, and are caused to contribute to the control of a fast saw tooth wave generator, which is started in response to transmission of a pulse from the ground station and stopped in response to reception at the ground station of a pulse deriving from the aircraft.

Each aircraft receiver and pulse transmitter provides, in accordance with the above description, a transponder system, the receiver of which is tuned in accordance with the altitude of the aircraft, and which is therefore operative to transpond only at such times as the ground transmitter frequency, in the course of its scanning cycle, passes through the frequency to which the receiver of the transponder is tuned.

A cathode ray indicator is provided at the ground station which is controlled in respect to vertical deflection in synchronism with the tuning of the ground transmitter, and in respect to horizontal deflection by the fast saw tooth generator previously referred to. Since a scanning cycle of the fast saw tooth generator is initiated in response to transmission of a pulse by the ground transmitter, and since termination of the cycle occurs in response to reception of a transponded pulse, horizontal deflections have lengths proportional to the time elapsed between transmission of a pulse and reception of a transponded pulse, which is in turn proportional to range. Since pulses are transponded from any aircraft only at times corresponding with the altitude of that aircraft, and since vertical deflections of the beam of the cathode ray indicator occur in synchronism with frequency scanning of the altitude corresponding frequency spectrum, the horizontal range traces are caused to occur at vertical positions on the face of the indicator corresponding with the altitude of the aircraft the range of which is being determined.

Proceeding now with a more detailed description of the invention, reference is made to Figure 1 which presents in functional block diagram an aircraft installation, in accordance with the present invention.

A continuous wave oscillator 1 is controlled in respect to frequency in correspondence with a measurement taken by a device, which in its broadest aspect may constitute a device for measuring any predetermined physical quantity. In the present application of the invention the measuring device 2 comprises an aneroid cell, which is capable of providing a measurement of altitude in terms of local barometric pressure. The cell 2 is associated with a tuner 3, which may take the form of a condenser, an inductance, or a combination of the two, and which is so associated with the oscillator 1 as to determine its tuning.

While the range of frequencies utilized by the oscillator 1 is a matter of choice, in view of various considerations of a practical nature I have selected a frequency range of 148–153 mc., to correspond with an altitude range of 0–10,000 ft. The oscillator 1 may radiate its energy by virtue of its connection with an antenna 4. A receiving antenna 5 applies energy received from a ground station to a mixer 6, which derives energy also from the oscillator 1. A shield 7 is provided between the antennas 4 and 5, to avoid excessive coupling therebetween, which might otherwise cause overloading of the mixer 6. In some installations, however, it may prove desirable to eliminate all coupling between mixer 6 and the oscillator 1 except such as occurs by virtue of residuary coupling between antennas 4 and 7.

The mixer 6 feeds into an I. F. amplifier 8, tuned to a center frequency of 5 mc., for a reason hereinafter to appear, and which is of relatively great selectivity. The output of I. F. amplifier 8 is detected in a detector 9 and applied to energize a pulsed oscillator 10, which radiates energy at a fixed frequency F, over an antenna 11.

The mixer 6, I. F. amplifier 8, and detector 9 are designed and intended for the reception of pulses, each received pulse being caused to pulse the oscillator 10, so that, in effect, a transponder is provided aboard the aircraft, which comprises a fixed tuned transmitter and a receiver tuned in accordance with the value of a measured quantity, specifically altitude or local barometric pressure. That the receiver tuning is in accordance with altitude is made evident upon consideration of the fact that the local oscillator of the receiver corresponds with the altitude tuned oscillator 1.

At the ground station, a functional block diagram of which is provided in Figure 2 of the drawings, an oscillator 20 feeds signals to a buffer amplifier 21, which in turn feeds a power amplifier 22 having an associated transmitting antenna 23. The power amplifier is normally inactive, being provided with pulsed energy by a pulser 24, and being operative to transmit pulses when, and only when, the pulser 24 is energized. The oscillator 20, buffer amplifier 21, and power amplifier 22 are gang tuned by condensers 25 associated therewith, the condensers 25 being rotated mechanically by means of a motor 26, the drive between the motor 26 and the condensers 25 being indicated conventionally by dotted line 27. The frequency range of the oscillator 20 in the course of the frequency scanning action consequent upon rotation of the condensers 25 extends from 153–158 mc., to match the band of frequencies translatable by the mixer 6, the 5 mc. I. F. amplifier 8 and detector 9, when operated in conjunction with the local oscillator 1, having a range of 148–153 mc.

The oscillator 20 is utilized not only as a control oscillator to determine transmitted ground frequencies, but also as a local oscillator for a ground receiver section, operating on the superheterodyne principle, and comprising a mixer 28 and an R. F. amplifier 29, the latter deriving signals from a receiving antenna 30. The amplifier 29 and the mixer 28 are gang tuned respectively by condensers 31, which are continuously rotated, by mechanical coupling 27, in synchronism with the condensers 25, and which effect scanning of the tuning of the receiver section over a range of frequencies extending from 148 to 153 mc., corresponding with the range of frequencies transmittable by oscillator 1 as a measure of altitude. By virtue of the synchronization of the rotations of condensers 31 and 25, the receiver tuning and the transmitter output frequency maintain a fixed frequency difference of 5 mc.

The output of the mixer 28 is applied to an I. F. amplifier 32, tuned to a center frequency of 5 mc., the output of the amplifier 32 being detected in a detector 33.

The output of the detector 33 is applied over a lead 34 to the pulser 24, and causes energization thereof, so that detection of signals by detector 33 is accompanied by transmission of one or more pulses by the power amplifier 25 at a time and at a frequency corresponding with the time of energization of pulser 24.

The motor 26 actuates not only the condensers 25 and 31, but also controls a sawtooth generator 35 to produce a sawtooth voltage synchronized with the tuning action of the condensers. The output of the sawtooth generator 35 is applied to the vertical plates 36 of a cathode ray oscilloscope 37, to cause vertical scanning of the beam of the oscilloscope in synchronism with the tuning of the receiver and transmitter sections of the ground equipment.

The beam of the oscilloscope 37 is normally biased beyond or to cut-off, by a control grid 38, which is connected to the detector 33 in such fashion that intensifying voltage is applied to the grid 38 upon detection of signals by detector 33.

Reviewing the operation of the apparatus described, let us assume that the oscillator 1 aboard an aircraft is tuned to a frequency $f$, falling in the range 148–153 mc., and specifically 150 mc. corresponding with an altitude of 4000 ft. As the ground receiver scans the range 148–153 mc., it periodically passes through the frequency $f=150$ mc., the oscillator 20 being at that instant tuned to a frequency $f+5$ mc.$=155$ mc. The output of R. F. amplifier 29 at 150 mc. and of oscillator 20 at 155 mc. are mixed in mixer 28 and provide a 5 mc. output, which is amplified and detected to provide an intensifying signal for the grid 38, and hence a cathode ray beam of sufficient intensity to produce a clearly visible indication at a vertical level on the face of the indicator 37 corresponding with an altitude of 4000 ft. The output of detector 33 is also applied to energize pulser 24, which causes transmission by the power amplifier 22 of one or more pulses at a ground transmitter frequency corresponding also with an altitude of 4000 ft., to wit, 155 mc.

The output of the amplifier 22 may be effectively received only aboard an aircraft which is at an altitude of 4000 ft. since only such an aircraft has an oscillator 1 tuned to a frequency of 150 mc., and is thus capable of converting a received signal at 155 mc. to an I. F. frequency of 5 mc.

The aircraft at 4000 ft. translates pulses deriving from the power amplifier 22 into pulses at the output of detector 9, which are applied to the oscillator 10 to cause transmission of a pulse at frequency F for each received pulse at frequency $f+5$ mc.

The pulse output of the oscillator 10 is received at the ground station by a pulse receiver 40, which feeds a detector 41, the output of which constitutes a cut-off pulse for the sawtooth generator 42. The latter is supplied with start pulses by an amplifier 43, connected over lead 44 with the pulser 24. Transmission of a pulse by power amplifier 22 is accordingly accompanied by initiation of generation of a sawtooth voltage in the generator 42, and reception at pulse receiver 40 of a pulse transmitted from the transponder oscillator 10 in response to the ground originating pulse results in termination of the voltage build up of the sawtooth generator 42 and its reconditioning for a further cycle of operation. The output of the generator 42 is applied to the horizontal plates 45 of the indicator 37, so that horizontal traces are produced thereon, at such times as the cathode ray beam is intensified, which have a length proportional to the range of a transponding aircraft. Accordingly, a linear indication 46 will be provided (see Figure 3) at the indicator 37, in response to signals from each aircraft in the vicinity of the ground station, the indications having a length corresponding with the range of the craft, and a vertical displacement corresponding with the altitude of the aircraft.

Normally the character of the indications 46 will depend on the character of the pulser 24. Should the pulser transmit a single pulse in response to each signal derived from detector 33 the indications 46 will comprise a single line. Should the pulser 24 be constrained to produce a group of pulses in response to each signal from detector 33, successive pulses of the group will occur at slightly different altitudes, since the various circuits of the equipment are of finite bandwidth, and consequently respond over a slight but appreciable range of values centering about the nominal values referred to in the above description as the frequency of the ground equipment varies in the course of a scanning operation.

Still a further embodiment of the present invention is illustrated in Figures 4 to 6 inclusive of the drawings.

Referring now more specifically to Figure 4 of the drawings there is illustrated a transponder system 100, which is indicated to be airborne for the purpose of the present invention and which may be located in an aircraft or an airborne missile. The transponder 100 comprises a superheterodyne type receiver 101, having associated therewith a receiving antenna 102, and is adapted to receive and detect pulses of the character generally transmitted by pulse type radar equipments and interrogator-responser equipments.

The output of the receiver, in the form of detected pulses, is applied to a transmitter 103 having an antenna 104 associated therewith as a radiating element, and the transmitter 103 is arranged to transmit signals only in response to the appplication to said transmitter of a detected pulse from the receiver 101.

The tuning of the receiver 101 and of the transmitter 103 is controlled by an oscillator 105, which acts simultaneously as the local oscillator of the receiver 101 and as the master oscillator for the transmitter 103. By virtue of this expedient the transmitter 103 and the receiver 101 are caused to track in respect to frequency, maintaining a constant difference frequency therebetween, equal in value to the intermediate frequency of the superheterodyne receiver 101.

The oscillator 105 may be controlled in respect to frequency in any one of a number of ways, and in response to any one of a number of different physical quantities. I have chosen to exemplify the present invention as applied to the measurement of atmospheric pressure and consequently of local altitude, but the invention is not limited to this application, and may in fact be utilized in conjunction with any type of measuring device which is capable of determining and controlling the frequency of an oscillator, and it is believed that there are substantially no measuring devices which are not so capable, by means of adaptations which are per se known to those skilled in the art.

In one actual embodiment of the invention the receiver 101 was provided with an I. F. amplifier having a center frequency of 5 mc. and a relatively narrow pass band. The receiver 101 was then made tunable over the range of frequencies 153–158 mc. by arranging the altitude controlled oscillator 105 to have a range of frequencies extending from 148–153 mc., over the range of altitudes which it was desired to measure. The transmitter 103, then, being controlled in respect to frequency directly by the oscillator 105 is caused to transmit signals over the band of frequencies 148–153 mc., and is maintained at all times at a frequency 5 mc. below that of the receiver 101.

A ground equipment adapted for co-action with the transponder 100 is illustrated in block diagram in Figure 5 of the drawings, and constitutes in essence a frequency scanning interrogator-responser, the interrogator continuously scanning the band of frequencies allocated to the airborne receiver 101 and the responser continuously scanning the band of frequencies allocated to the airborne transmitter 103. By virtue of this arrangement the transponder 100 is operated only at one point in the scanning cycle of the interrogator responser, and indicator means are provided for indicating in coordinated fashion the instant in the scanning cycle at which transponse takes place, as well as the range of the transponding equipment. Since the instant at which transponse takes place is a function of the frequency of the transponder which in turn is a function of the magnitude of a measured quantity, it will be apparent that the indications provided at the interrogator-responser constitute a simultaneous measurement of the range of a transponder and of the value of a measurable quantity associated with the transponder.

Referring now more specifically to Figure 5 of the drawings, an oscillator 200 is provided, which is turnable over the range 153–158 mc., inclusive, in the present embodiment of the invention, to correspond with the selected tuning range of the receiver 101. Tuning is accomplished by means of a condenser 201, connected in tuning relation to the oscillator 200 and driven by a motor 202 at any convenient rate, periodically to scan over its assigned range.

The oscillator 200 controls the frequency of oscillation of a power amplifier 203, the input of which is connected to the output of the oscillator 200, and which is periodically tuned similarly to the oscillator 200 by means of a condenser 204 ganged with the condenser 201. An antenna 205 is connected to the output of the power amplifier 203, and is designed efficiently to radiate the output thereof.

The power amplifier 203 is pulsed by a pulser 206 in accordance with known radar practice at a rate such that at least one pulse is transmitted for every small increment in frequency during the scanning cycle. The action of the pulser 206 serves, in response to each pulse, to initiate generation of a fast range-indicating sweep voltage, in the generator 207, the output of the latter being applied to the horizontal plates 208 of an oscilloscope 209. The beam of oscilloscope 209 is normally biased back beyond or to cut-off, and is subject to intensity control in response to voltage applied to its intensity control grid 210.

A sweep generator 211 is provided which produces a slow saw-tooth sweep voltage which is synchronized with the scanning action of the condensers 201 and 204, the sweep voltage being applied to the vertical plates 212 of the oscilloscope 209. The law of variation of the vertical sweep voltage is so correlated and synchronized with the frequency variation or scanning action of the oscillator 200 that the instantaneous vertical coordinate of the beam of the oscilloscope 209 is a measure, at all times, of the instantaneous frequency of that oscillator, and consequently of the frequency of transmission of the interrogator section of the apparatus of Figure 5.

Since, as has been stated heretofore, the fast sweep generator 207 is caused to produce a horizontal deflection of the cathode ray beam of the oscilloscope 209 in response to each transmitted pulse, in a manner well known per se in the radar art, the entire face of the oscilloscope is scanned by the cathode ray beam once for each scanning cycle of the sweep generator.

Pulses transmitted by the power amplifier 205 are transmitted over the antenna 205, which may be directional if desired, and upon reception by the transponder 100 at such times as the pulse carrier frequency falls within the transduction range of the transponder 100, are repeated at the frequency of the transmitter 103 and received and detected by the responser section of the apparatus illustrated in Figure 5 of the drawings.

The responser section comprises a receiving antenna 213, which may be directional, if desired, and which applies signals intercepted thereby to an R. F. amplifier 214. The output of the R. F. amplifier 214 as well as signal derived from the oscillator 200 are applied to a mixer 215, which in turn feeds an I. F. amplifier 216, tuned to a center frequency of 5 mc., to correspond with the difference frequency between transmission and reception allocated to the presently described embodiment of the invention. The output of the mixer 215 is detected in a detector 217 and applied over lead 218 to the intensity grid 210, to cause intensification of the beam of the oscilloscope 209.

The R. F. amplifier 214 and the mixer 215 are tunable by means of ganged condensers 217 and 218, the latter being actuated in a continuous and periodic frequency scanning cycle by the motor 202, in synchronism with the scanning action of the condensers 201 and 204. The actual tuning of the R. F. amplifier 214 and of the mixer 215 takes place over a range of frequencies 148-153 mc., corresponding with the range of possible transmission frequencies of the transmitter 103, and the instantaneous frequency of tuning of the R. F. amplifier 214 and of the mixer 215 is maintained continuously at a value 5 mc. below that of the oscillator 200 and the power amplifier 203. By virtue of the above arrangement the responser section of the interrogator responser of Figure 5 is enabled to receive signals at any given instant of time only from transponders which are at a proper altitude to be interrogated by the interrogator section of the apparatus of Figure 5, at that particular instant of time. The pulse output of the detector 217, being applied to the intensity control grid 210, causes production of a bright spot on the face of the oscilloscope 209 at a point corresponding with the range of the interrogated transponder, in terms of its horizontal co-ordinate, and that point has simultaneously a vertical co-ordinate corresponding with the altitude of the interrogated transponder, by virtue of the correlation existing between the vertical position of the cathode ray beam and the frequency scanning action of the interrogator responser. Since transponders at different altitudes are interrogated in succession, and since the time of pulse returns from each transponder will be determined, still further, by the range of that transponder, the simultaneous positions of a plurality of aircraft, in respect to both range and altitude may be presented, by the action of the present invention, as bright spots on the face of the oscilloscope 209, each spot having a vertical coordinate corresponding with the altitude and a horizontal coordinate corresponding with the range of one aircraft, as illustrated in Figure 6 of the drawings.

It will, of course, be clear, since the controlled oscillator of the transponder 100 may be controlled in accordance with any desired physical quantity, that the presentation of Figure 6 may be caused to represent a plot of the values of any selected physical quantities associated with a plurality of transponders 100, against the ranges of those transponders. By way of example, the controlled oscillator 105 may be made responsive to bearing or speed of an aircraft or rocket, temperature or degree of atmosphereric ionization adjacent to an aircraft or rocket, rate of climb or descent of an airborne missile, as well as many other quantities too numerous to mention. Nor is the applications of the invention limited to use aboard airborne devices, since bearing, speed, etc., of vehicles or other devices adjacent to the earth may be likewise measured remotely, by the use of my invention.

It will further be obvious, while I have disclosed my invention as applied to radar equipments, and as utilizing pulses of electromagnetic energy, that similar results may be obtained in application to sonar equipments, utilizing pulses of sonic or supersonic energy, whereby a field of application to submarine telemetrics is opened up.

While I have described my invention, together with various applications thereof, in terms of certain specific embodiments thereof, it will be clear that variations of the specific arrangements disclosed may be resorted to without departing from the true spirit of the invention, which is defined particularly in the appended claims.

What I claim and desire to secure by Letters Patent of the United States is:

1. In combination, means for measuring range of a remote elevated object from a predetermined location by measuring transmission time of radiant energy between said predetermined location and said remote object, means for providing a displaceable indication of said range, means at said remote elevated object for characterizing said radiant energy in accordance with the elevation of said elevated object, and means responsive to said radiant energy so characterized for displacing said indication of said range in accordance with said elevation.

2. In combination, a normally quiescent transmitter, means for varying the tuning of said transmitter periodically over a predetermined range of frequencies, remote means for transmitting signals having a frequency which bears a predetermined relation to the value of a measurable quantity, and means responsive to said signals for establishing transmissions from said transmitter only at times in the course of said periodic tuning corresponding with the value of said measurable quantity.

3. In combination, a first transmitter for transmitting signals having at least one characteristic which is dependent for its value on the value of a measurable quantity, a second transmitter adapted to transmit pulses, means normally maintaining said second transmitter quiescent, means for cyclically tuning said second transmitter over a predetermined frequency spectrum, means responsive to said signals for disabling said means for normally maintaining said second transmitter quiescent at a point in the tuning cycle of said second transmitter which bears a predetermined relation to a value of said at least one characteristic.

4. In combination, a first transmitter tunable to transmit signals at a frequency within a selected band of frequencies which is determined in accordance with its altitude, a normally quiescent pulse transmitter, means for periodically varying the tuning of said pulse transmitter over a predetermined band of frequencies, means for energizing said pulse transmitter to transmit pulses at points in the periodic variable tuning thereof which are determined by the frequency of said signals transmitted by said first transmitter, and a pulse repeater associated with said first transmitter and responsive to pulses deriving from said normally quiescent pulse transmitter to repeat said pulses.

5. The combination in accordance with claim 4 wherein is further provided in association with said pulse transmitter an indicator element deflectable in two dimensions, means for deflecting said element in one of said two dimensions in synchronism with said tuning of said pulse transmitter, means responsive to each transmitted pulse transmitted by said pulse transmitter for initiating a deflection of said element in a second of said two dimensions, means for receiving pulses from said pulse repeater, and means responsive to pulses received by said last named means for modulating said initiated deflections.

6. A distance measuring equipment comprising, a tunable transmitter for transmitting pulse energy to remote objects, a tunable pulse receiver for receiving pulses transmitted by said transmitter upon return of said pulses from said remote objects, means for synchronously and cyclically tuning said transmitter and said receiver, and means for maintaining a fixed frequency difference between the frequency of said receiver and the frequency of said transmitter during said tuning.

7. A distance measuring equipment comprising, a control receiver, a pulse transmitter, a pulse receiver for receiving pulses repeated from a remote object in response to pulses transmitted by said pulse transmitter, and means responsive to signals received by said control receiver for determining times of transmission of pulses transmitted by said pulse transmitter.

8. The combination in accordance with claim 7 wherein said pulse transmitter is cyclically tunable over a predetermined band of frequencies.

9. The combination in accordance with claim 7 and further comprising means for cyclically tuning said pulse transmitter and said control receiver in synchronism, said pulse receiver being fixed tuned.

10. In combination, a first transmitter carried aboard an aircraft, means for tuning said first transmitter in accordance with the altitude of said aircraft, a pulse repeater carried aboard said aircraft having a receiver tuned in accordance with the altitude of said aircraft, a ground located pulse transmitter, a ground located pulse receiver having means for cyclically tuning said receiver to receive signals from said first transmitter at one point only in the tuning cycle of said pulse receiver, means for cyclically tuning said ground located pulse transmitter to transmit pulse signals periodically within the tuning range of said receiver carried aboard said aircraft, means maintaining said ground located transmitter normally inoperative to transmit, and means responsive to reception of a signal by said ground located receiver for causing transmission of pulses by said ground located transmitter.

11. The combination in accordance with the claim 10, and further comprising an indicator having means for providing an indication deflectable in two dimensions, means for deflecting said indication in one of said dimensions in synchronism with said cyclical tuning, and means for producing a deflection of said indication in the other of said dimensions the length of which is a function of the time elapsed between transmission of a pulse by said ground located transmitter, and return of said pulse to said ground located transmitter via said pulse repeater carried aboard said aircraft.

12. The method comprising the steps of: transmitting pulses from a first location, repeating said pulses from a remote object, receiving said repeated pulses at said first location after repetition from said remote object, controlling the times of transmission, relative to reference times, of each of said pulses from said first location in accordance with the value of a measurable quantity, and displaying as a unitary indication time lapses between said times of transmission of each pulse from said first location and said reference times and the time elapsed between transmission and reception of said pulses.

13. The method comprising the steps of: transmitting periodic pulses, repeating said pulses from a remote object, receiving said pulses after repetition from said remote object, controlling the periodic times, with respect to a reference time, of transmission of said pulses, in accordance with the value of a quantity as measured at said remote object, and providing simultaneous indications of said times of transmission with respect to said reference time and of the elapsed time between transmission and reception of said pulses.

14. The method in accordance with claim 13 wherein said measured quantity corresponds with a navigational parameter associated with said remote object.

15. The method in accordance with claim 13 wherein said measured quantity corresponds with the altitude of said remote object.

16. In combination, a transmitter for transmitting signals to a remote object for return therefrom, a receiver for receiving said signals after return from said remote object, an indicator for providing a visual display of the range of said remote object as derived from said signals, means at said remote object for characterizing said signals in accordance with the value of a measurable quantity, and means for modifying said visual display in response to said signals, to render said visual display indicative of said value of said measurable quantity.

17. In combination, a pulse transmitter for transmitting pulses of radiant energy, means for predetermining the frequency of said radiant energy, means for periodically sweeping said predetermined frequency continuously between upper and lower limits of a predetermined range of frequencies in accordance with a predetermined law of variation of frequency with time, a remote pulse receiver, a remote pulse transmitter coupled with said remote receiver to transmit pulses only in response to reception of pulses by said pulse receiver, means for tuning said remote pulse receiver to a predetermined frequency within said predetermined range of frequencies to establish pulse transmission from said remote pulse transmitter only at times determined by said predetermined law of variation of frequency with time and said last mentioned predetermined frequency.

18. In combination, an indicator having means for providing an indication capable of motion in a plurality of direction, a device remote from said indicator comprising means for measuring the value of a measurable quantity, means coupled with said indicator for measuring the range of said device, said last named means comprising means for transmitting signals to said device and for receiving responded signals from said device, means at said device for imposing on said responded signals an information bearing characteristic determined in accordance with said value of a measurable quantity, means for determining said indication in one of said plurality of directions in accordance with said range as determined by said means for measuring range, and means for determining the indication of said indicator in another of said plurality of directions in accordance with said value of a measurable quantity as determined by said means for measuring.

19. In combination, a pulse repeater comprising a receiver for receiving pulses and a transmitter for repeating received pulses, and means responsive to the value of a measurable quantity as measured adjacent said pulse repeater for determining the tuning of said transmitter and of said receiver.

20. In combination, an indicator having means for providing an indication element capable of motion in two dimensions, means remote from said indicator for measuring the value of a quantity, means coupled with said indicator for measuring range from a predetermined point of said remote means by measuring transmission time of wave energy between said remote means and said predetermined point, means for indicating said range on said indicator in terms of motion of said indication in one of said dimensions, and means responsive to said means remote from said indicator for displacing said indication in the other of said dimensions in accordance with the value of said quantity.

21. In combination, a continuously transmitting elevated transmitter of wave energy, means for determining the frequency of said wave energy in accordance with the altitude of said transmitter, a remote receiver for said wave energy, means for tuning said receiver periodically through the frequency of said wave energy, whereby said receiver receives wave energy from said transmitter periodically at times, measured from a reference time, determined by said altitude of said transmitter, and means responsive to reception of said wave energy by said receiver for transmitting a pulse of further wave energy.

22. In combination, a continuously transmitting elevated transmitter of wave energy, means for determining the frequency of said wave energy in accordance with the altitude of said transmitter, a remote receiver for said wave energy, means for tuning said receiver periodically through the frequency of said wave energy, whereby said receiver receives wave energy from said transmitter periodically at times, measured with respect to a reference time, determined by said altitude of said transmitter, means responsive to reception of said wave energy by said receiver for transmitting a pulse of further wave energy, means located proximately to said elevated transmitter for receiving said pulse of further wave energy and for re-transmitting a responsive pulse of wave energy, and means located proximately to said remote receiver for receiving said responsive pulse of wave energy and for translating said responsive pulse into an indication of range and altitude of said elevated transmitter.

23. In a navigational system for aircraft, a pulse transmitter transmitting pulses of radiant energy to said aircraft, means aboard said aircraft for re-transmitting said pulses of radiant energy as further pulses, means for receiving said further pulses, means for converting said pulses and said further pulses into an indication of range of said aircraft, and means located aboard said aircraft for determining times, with respect to a reference time, of transmission of said pulses of radiant energy to said aircraft in accordance with elevation of said aircraft.

MARCEL WALLACE.

REFERENCES CITED

The following references are of record in the file of this patent:

UNITED STATES PATENTS

| Number | Name | Date |
|---|---|---|
| 1,894,019 | Buckley | Jan. 10, 1933 |
| 2,171,293 | Plastino | Aug. 29, 1939 |
| 2,195,290 | Shofstall | Mar. 26, 1940 |
| 2,252,083 | Luck | Aug. 12, 1941 |
| 2,262,218 | Andrews | Nov. 11, 1941 |
| 2,312,203 | Wallace | Feb. 23, 1943 |
| 2,402,459 | Smith | Jan. 18, 1946 |
| 2,403,603 | Korn | July 9, 1946 |
| 2,403,729 | Loughren | July 9, 1946 |
| 2,405,231 | Newhouse | Aug. 6, 1946 |
| 2,409,456 | Tolson | Oct. 15, 1946 |
| 2,414,469 | Isbister | Jan. 21, 1947 |
| 2,416,591 | Muntz | Feb. 25, 1947 |
| 2,417,032 | Wolff | Mar. 4, 1947 |
| 2,419,620 | Young | Apr. 29, 1947 |
| 2,421,106 | Wight | May 27, 1947 |